Sept. 18, 1934.  H. L. BLUM  1,974,202
FLUID METER
Filed Oct. 3, 1931  4 Sheets-Sheet 1
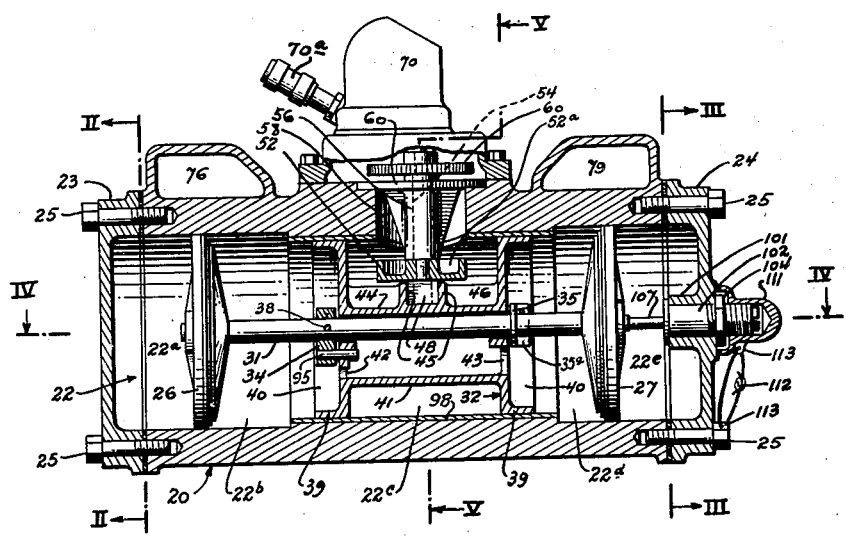
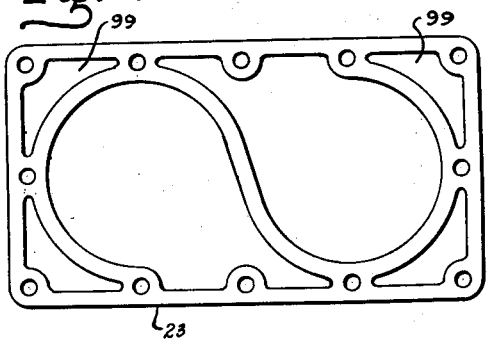
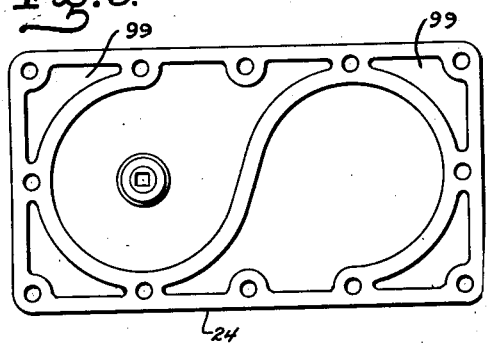
INVENTOR.
Hosmer L. Blum
BY
ATTORNEY Sept. 18, 1934.  H. L. BLUM  1,974,202
FLUID METER
Filed Oct. 3, 1931   4 Sheets-Sheet 2

INVENTOR.
Hoomer L. Blum
BY
ATTORNEY

INVENTOR.
Hosmer L. Blum
BY
ATTORNEY

Sept. 18, 1934.  H. L. BLUM  1,974,202
FLUID METER
Filed Oct. 3, 1931  4 Sheets-Sheet 4

INVENTOR.
Hosmer L. Blum
BY
ATTORNEY

Patented Sept. 18, 1934

1,974,202

UNITED STATES PATENT OFFICE 1,974,202

FLUID METER

Hosmer L. Blum, Alameda, Calif.

Application October 3, 1931, Serial No. 566,611

17 Claims. (Cl. 73—30)

This invention relates to meters. More particularly the invention relates to a type of meter adapted to the measurement of fluids, liquids, gases and the like, and has particular reference to the class of meters which are operated by the pressure of the fluid measured by the meter as the fluid is in transit through the meter.

In general, the invention consists of a plurality of cylinders having simultaneously reciprocable pistons, valves reciprocable with the pistons, intercommunicating conduits in series between cylinder chambers, and mechanism whereby the quantity of fluid passing through the meter may be registered or visibly indicated.

An object of the invention is to provide a positive displacement meter which will register with extreme accuracy the quantity of liquid passing through the meter at various velocities and under varying pressures, the action of which is uniform regardless of varying viscosities of the fluid passing therethrough. Other objects are to provide a positive displacement meter capable of metering large quantities of fluid, yet having constant accuracy under extremely low head pressures and slow rates of flow; to provide a meter of simple construction and economical manufacture having a minimum number of moving parts in frictional contact; to provide a meter in which there is a hydrostatic balance on frictional surfaces; to provide a meter in which the opening and closing of valves is automatically timed and operated by the flow of fluid through the meter, and wherein the quantity of liquid expelled is determined by the same mechanical movement as is actuated by fluid influx; to provide a convenient accessible means for adjusting the stroke of meter pistons, and generally to improve upon the known types of fluid meters.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more clearly comprehend the invention, reference is directed to the accompanying drawings, wherein—

Fig. 1 is a longitudinal vertical section through a cylinder block showing pistons in full lines, Fig. 2 is an elevation of cylinder head at one end, on line II—II of Fig. 1.

Fig. 3 is an elevation of cylinder head at end opposite the view of Fig. 2, on line III—III of Fig. 1.

Figure 4:
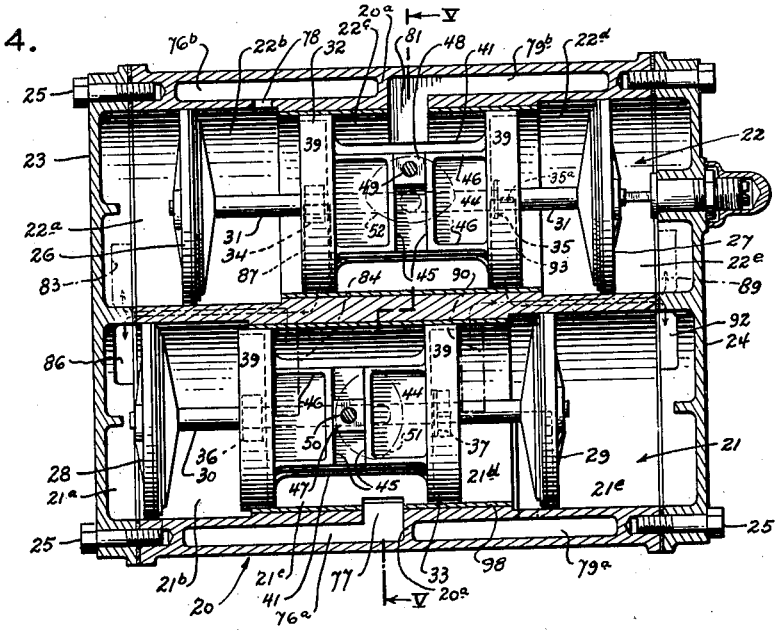
Fig. 4 is a horizontal laterally transverse view of section on line IV—IV of Fig. 1.

Figs. 11 to 14 inclusive, are diagrammatic horizontal longitudinal sections showing positions of pistons and valves with relation to valve ports and inlet and outlet openings, at stages in a cycle of operation.

Referring to the drawings, wherein like characters of reference designate corresponding parts:—20 represents, generally, a cylinder block or housing which is preferably formed with as large a portion thereof integral as approved casting and machining practices will permit, and which provides broadly and generally speaking, a plurality of cylindrical chambers 21 and 22, two of such chambers being shown herein as a preferred exemplification of the invention.

Within the block or housing and lying circumferential of the cylinders are conduit passages hereafter described, and are separated laterally transverse the housing by a wall 20a. It will be necessary to describe the cylinder block more in detail as the specification proceeds.

Cylinder heads 23 and 24 are provided at the respective ends of the cylinder block 20 and are mounted thereon by suitable bolts 25, thus closing the ends of the cylinder chambers. Each cylinder has two pistons, those in cylinder 22 being indicated 26 and 27, and those in cylinder 21 being designated 28 and 29, said pistons being disposed so as to reciprocate one in each end portion of each cylinder, wherein they are adapted for snug, liquid-proof fit with the inner cylinder walls of the piston chambers. Each of the cylinder chambers 21 and 22 are continuous tubular structures, but each may be referred to as being divided into five cylindrical sections 21a, b, c, d, e, and 22a, b, c, d, e. Sections 21a, 21e, 22a and 22e are those portions of cylinder chambers lying between the respective piston heads and the adjacent cylinder head; sections 21b, 21d, 22b and 22d are those portions of cylinder chambers lying between the respective piston heads and the adjacent valve heads; sections 21c and 22c are those portions of the cylinder chamber lying between the opposite heads of the respective valves.

Each pair of pistons in the respective cylindrical chambers 21 and 22 are connected in spaced relation at opposite ends of connecting rods 30 and 31, on which are mounted cylindrical valves 32 and 33 which snugly fit the cylinder walls and reciprocate with the respective pairs of pistons and the respective connecting rods on which they are centrally mounted longitudinally intermediate and in spaced relation to the pistons, thus forming the five sections in each cylinder chamber described above.

The valves 32 and 33 have reciprocal movement in unison with the respective piston connecting rods to which they are connected by suitable means, such as collars 34, 35, 36, 37, fixedly secured to the connecting rods, as by clamping bolts 38. Adjustment means hereafter described may be provided on the connecting rods which will slightly modify the collar construction.

Figure 5:
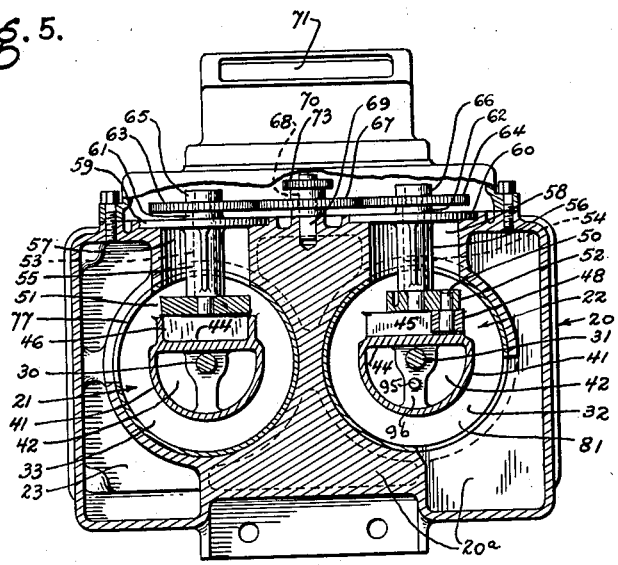
Fig. 5 is a vertical transverse section on line V—V of Fig. 1 and Fig. 4.
Figure 6:
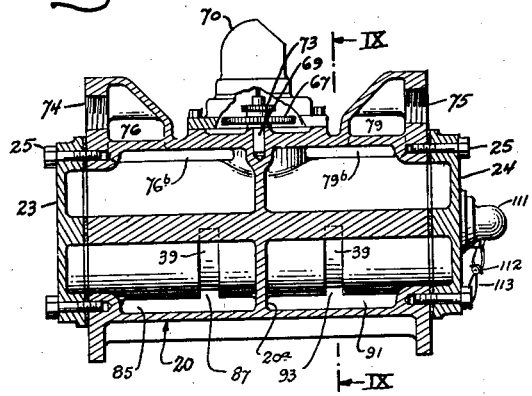
Fig. 6 is a longitudinal vertical section on line VI—VI of Fig. 8.
Figure 8:
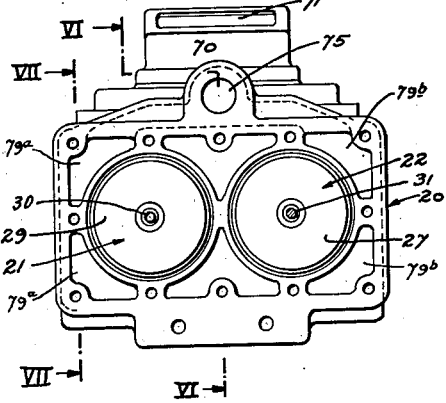
Fig. 8 is an end view with cylinder head removed.
Figure 7:
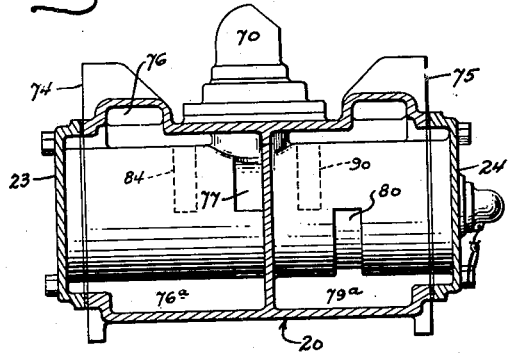
Fig. 7 is a longitudinal vertical section on line VII—VII of Fig. 8.
Figure 9:
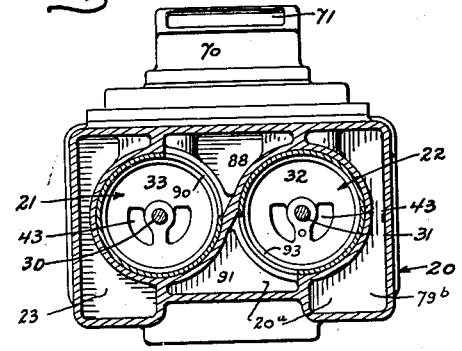
Fig. 9 is a vertical laterally transverse section on line IX—IX of Fig. 6.

The valves 32 and 33 in each cylinder are of similar construction and are preferably spool-like in form having spaced heads 39 which may be recessed as at 40 for the purpose of eliminating weight. Connecting the heads 39 is a hollow drum 41, semi-spherical in lateral transverse section, with a substantially flat top 44, as best shown in Fig. 5, said drums being of lesser radius than the radius of the diameter of the heads 39, said drums having openings 42 and 43 at opposite ends. The flat top 44 mounts laterally transverse thereof a pair of upstanding parallel walls forming what is commonly termed a Scotch yoke 45 which, for mechanical strength, may have longitudinal braces or ribs 46 connected with the opposing end walls of the valve heads 39. Blocks 47 and 48 have reciprocal sliding fit laterally transversely the top of the respective drums in each of the yokes 45 and have rotative mounting on pins 49, 50, which are mounted on cranks 51, 52, set at 90° relative to each other, which in turn are fixedly mounted on shafts 53, 54, which, as shown in Fig. 5, are vertically supported by sleeves 55, 56, supported through openings 57, 58 in the top wall of the respective cylinder blocks, said openings being closed by plates 59, 60 which are provided with spacer bosses 61, 62. The shafts 53, 54 extend beyond the bosses 61, 62 and mount gears 63, 64 at their free end portions to rotate therewith, the gears being maintained on said shafts by suitable means, such as nuts 65, 66. The cranks 51, 52 are preferably ellipsoidal in plan so as to economize space in cylinders 21, 22 and weight may be saved by recesses 52a.

Intermediate gears 63, 64, and intermeshing therewith is an idler wheel or gear 67 which causes the relative rotation of gears 63, 64, to be synchronized in unison in the same direction of rotation. The idler gear 67 is fixedly mounted to a shaft 68 rotated in unison with gear 67 and which has rotatable bearing in the cylinder block 20, as at 69, said shaft leading to any well known registering device 70, provided with a plastic stuffing box 70a, shown generally only, as the mechanical detail thereof may assume any well known and practical form, the registering device having a casing having a sight opening 71 therein. Additional pinion gears, such as 73, may be provided on the shaft 68 for the purpose of accomplishing any desired ratio between the registering device and the rotation of idler gear 67.

Returning to the cylinder block for a more detailed description, a series of passages or conduits are provided so that the fluid to be metered may flow into, through and out of the meter, and in its course of flow, so actuate the piston and valve mechanism of the meter that the quantity of fluid passing through the meter will be registered on the registering device.

The cylinder block has a fluid inlet opening 74 and a fluid outlet opening 75, to which hose or other conduit means may be attached. Intermediate the said two openings are passages or conduits in the cylinder block, and through which the fluid flows, and by which the fluid is conveyed to ports in the cylinder chambers, wherein it reciprocally actuates the pistons.

Beginning at the inlet opening 74, which is preferably located centrally of the upper side of an end of the cylinder block, is conduit 76. From the diagrammatic views of Figs. 11 to 14 inclusive, it will be noted that the conduit 76 has two branches, leading in opposite directions, one 76a leading to cylinder 21 through inlet port 77 in the cylinder wall at section 21c and within the "D" of the valve 33; the other branch 76b leads to cylinder 22 through inlet port 78 in the cylinder wall of section 22b intermediate the inner face of piston 26 and the adjacent head 39 of valve 32. The outlet opening 75 also has a conduit 79 leading thereto, which also is divided into two branches, one of which 79a leads to outlet port 80 in the wall of cylinder 21 at the section 21d; the other branch 79b leads to cylinder 22 and to outlet port 81 in the cylinder wall at section 22c thereof.

Intercommunicating between cylinders 21 and 22 are additional conduits connecting with cylinder ports, the positions of which have been indicated in Fig. 4, those ports lying below the line of cross section of Fig. 4 being shown in dash lines and those ports lying above the line of cross section being shown by dot and dash lines. These conduits and ports intercommunicating between the cylinders may be designated as exchange conduits and exchange ports to differentiate from the inlet and outlet conduits and ports. The exchange conduits and ports are described as follows:—Conduit 82 leads from port 83 in cylinder section 22a to port 84 which is alternately in cylinder sections 21b and 21c; conduit 85 leads from port 86 in cylinder section 21a to port 87 which is alternately in cylinder sections 22b and 22c; conduit 88 leads from port 89 in cylinder section 22e to port 90 which is alternately in cylinder sections 21c and 21d; conduit 91 leads from port 92 in cylinder section 21e to port 93 which is alternately in cylinder sections 22c and 22d.

The reason for alternation of the ports 84, 87, 90 and 93 relative to the respective cylinder sections 21b, c and d, and 22b, c and d, into which they alternately open, is that the respective cylinder sections 21c and 22c are formed by the "D" of valves 32 and 33, which reciprocate and thus change the location of the cylinder sections 21c and 22c relative to the port which opens thereinto; but the location of the other ports are constant relative to the cylinder sections into which they open.

A cycle of operation of the meter may be traced as follows:—Starting with the diagrammatic view of Fig. 11, with mechanism disposed as shown therein; assuming the meter to be entirely empty and assuming a source of fluid supply, with a pressure either mechanical or gravity exerted thereon to cause the fluid to flow through inlet opening 74, the fluid will divide into two streams, one of which will flow through conduit 76b through port 78 and into cylinder section 22b from whence it is free to flow through openings 42, 43 and into section 22d, and at that point its flow must cease in cylinder 22, as ports 87 and 93 are closed at this moment; likewise the other fluid stream will flow through conduit 76a, port 77 into section 21c, thence exteriorly of drum 41 of valve 33, through port 84, passage 82, port 83 and into cylinder section 22a. The pressure on the fluid continues at the source of supply, and this pressure is exerted at this period of the cycle on the head of piston 26; a hydrostatic balance existing in the fluid between pistons 26 and 27, no resistance to movement of the pistons and valve is offered by the fluid in sections 22b and 22d. As the pressure of fluid continues, the piston 26 is depressed on what may be termed its down stroke, at the same time permitting additional fluid to be received through conduit 76, port 77 and conduit 82. The down stroke of piston 26 carries with it the valve 32 which correspondingly moves the Scotch yoke thereon so that the block 48 is arcuately moved and drawn inwardly toward the longitudinal axis of shaft 30.

Figure 11:
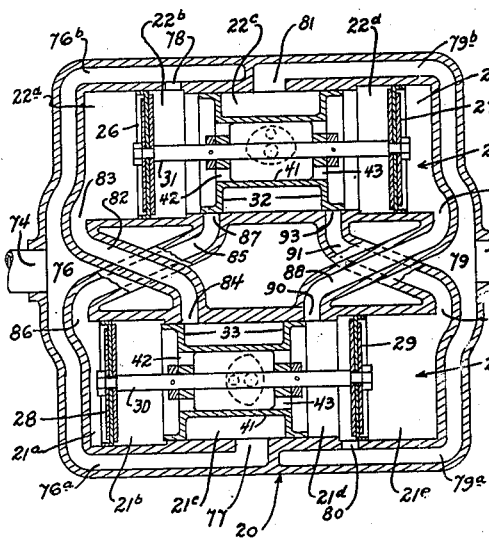

Since it will be noted that the cranks 51 and 52 are relatively set at 90° which eliminates possibility of a dead center resistance, it is obvious that when the downward stroke of piston 26 begins from position shown in Fig. 11, the downward stroke of piston 28 will also begin from its maximum up-stroke, shown in Fig. 11.

Figure 12:
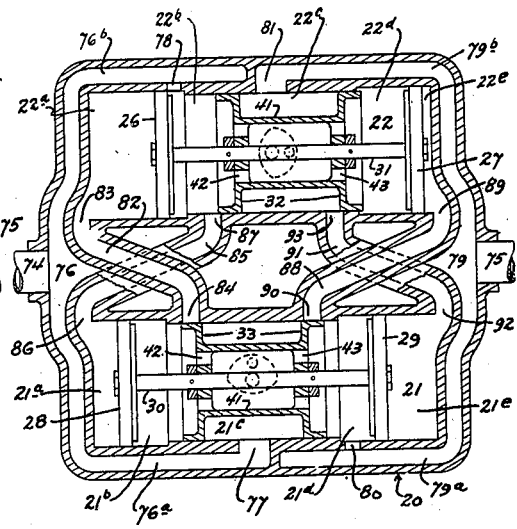
Figure 13:
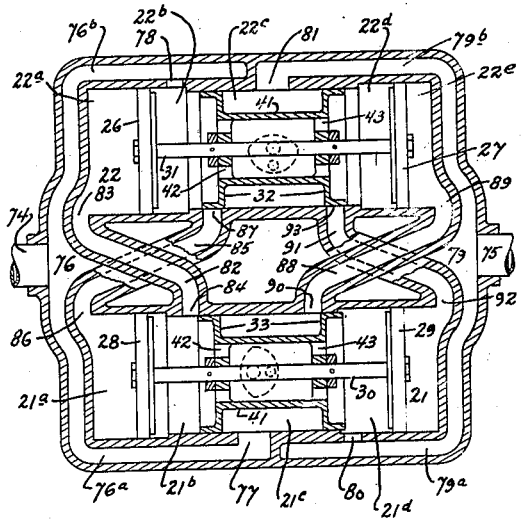

Now proceed to Fig. 12. As the down-stroke of piston 26 continues (the valve 32 moving therewith) the valve port 87 is opened, permitting incoming fluid to flow from section 22b through port 87, passage 85, port 86 and into section 21a, where it exerts a down stroke pressure on piston 28, and simultaneously port 84 and passage 82 have been closed by the head of valve 33, thus cutting off the incoming flow from conduit 76a through port 77.

As the pressure continues to depress piston 28 and thus fill section 21a with fluid, the head of valve 33 passes downwardly beyond port 84 which is thereupon opened (see Fig. 13) and the opposite head 39 of valve 33 has likewise passed beyond and thereby opened port 90 to influx of fluid from conduit 76a through port 77, and through conduit 88 into section 22e of cylinder 22, which directs the pressure of incoming fluid against the piston 27, which impels that piston on a downward stroke, and thereby impels piston 26 on its upward stroke, thereby forcing fluid from section 22a to section 21b from whence it may flow through the drum of valve 33 and also fill section 21d and through port 80 and to the conduits 79a and 79 and pass out through opening 75. Thus far, we have dealt with the actuation by pressure on pistons 26, 27 and 28 only.

Figure 14:
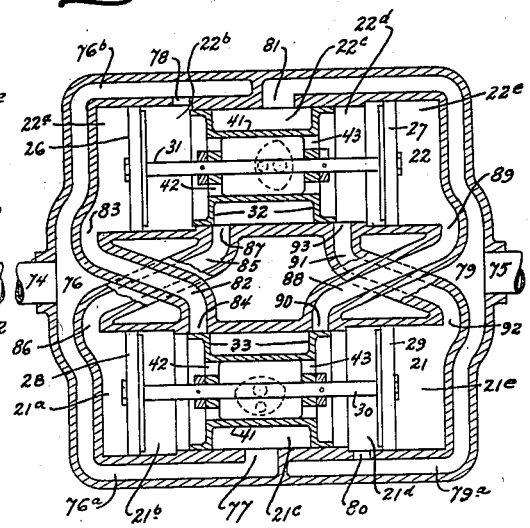

Proceeding now to Fig. 14, it will be remembered that sections 22b and 22d as well as the drum of valve 32 were completely filled with fluid by the influx at position of cycle shown in Fig. 11. In Fig. 12, upon opening of port 87 additional fluid influx is admitted through port 78, the only out or escape for which is through port 87 and thence to section 21a where it depresses piston 28.

It will be noted that the port 93 at the operative cycle shown in Figs. 11 and 12 does not communicate with the section 22d. However, upon the upward reciprocation of shaft 31 carrying with it valve 32, the valve head 39 passes and thereby opens port 93 to communication with section 22d, and since there is communication between section 22d and port 78, the pressure of fluid influx is exerted upon piston 29 to actuate it on a downward stroke, at the same time expelling the fluid in section 21a through conduit 85 and into section 22c, where it flows circumferentially of the drum of valve 32 and through port 81 into branch conduit 79b and conduit 79, thence from the outlet 75.

It will be observed from the foregoing cycle of operation that each of the sections 21a to e, inclusive, and sections 22a to e inclusive have received a charge of fluid which at sometime in the cycle has actuated a piston and has then been discharged through orifice 75. It is further obvious that if the flow of fluid through inlet 74 is continuous, as is contemplated, the cylinders 21, 22 and each of the sections thereof are continuously charged with a supply of fluid.

It will be further observed that in the several stages of cycle shown in Figs. 11 to 14, only one piston head is subject to incoming pressure at a time, and that when incoming pressure is exerted on one cylinder head, the outlet port of the opposite end of that cylinder is open.

It is also indicated that the incoming fluid stream is divided into two streams, one flowing through port 77 and the other flowing through port 78, and that each of these streams is again subdivided into two streams, the stream of port 78 alternately flowing into sections 21a and 21e to actuate the respective pistons 28 and 29, and the stream of port 77 alternately flowing into sections 22a and 22e to actuate the respective pistons 26 and 27.

To more simply and graphically trace this course of flow of the respective streams, let it be assumed that four floats or corks be placed in the fluid stream at inlet 74, and that two corks follow the direction of flow in each of the inlet conduits 76a and 76b, a blue and white cork in conduits 76a and a red and a yellow cork in conduit 76b. The respective corks flow through ports and cylinder sections indicated by respective designating characters as follows:—

Blue cork, (see Figs. 11 and 13 in order named); on inflow, 74, 76a, 77, 21c, 82, 22a (depresses piston 26); on outflow, 82, 21b, 21d, 79a, 75. White cork, (see Figs. 13 and 11 in order named); on inflow, 74, 76a, 77, 21c, 88, 22e (depresses piston 27); on outflow, 88, 21d, 80, 79a, 75. Red cork, (see Figs. 12 and 14 in order named); on inflow, 74, 76b, 78, 22b, 85, 21a, (depresses piston 28); on outflow, 85, 22c, 81, 79b, 75. Yellow cork (see Figs. 14 and 12 in order named); on inflow, 74, 76b, 78, 22b, 22d, 91, 21e (depresses piston 29); on outflow, 91, 22c, 81, 79b, 75.

The net analytical result of the foregoing diagram is that all of the incoming volume of fluid is effective at some stage of a cycle to depress some one of the pistons, and that, having exerted its force to depress one piston, it does not again exert its force on another piston, so that each volume of fluid passing through the meter is effective once only to rotate the respective cranks 51 and 52 and thereby the gears 63 and 64 which actuate the shaft 69 connecting with the registering device.

The foregoing describes the principal features of the metering mechanism.

While it will be noted that particularly from Figs. 4 and 11 to 14 that the shafts 53 and 54 are relatively offset from lateral transverse alignment, this arrangement is merely mechanical expediency to decrease the length of the cylinder block and yet allow space for the valve ports and has no bearing on the theory of the invention.

Rotation of the pistons in the cylinders may be avoided and for that purpose a pin 95 may be mounted in the collars 34, 35, 36, 37 and anchored in a web 96 of the opening in the end wall of the respective valves 32, 33, since those valves are prevented from axial rotation by the cranks 51, 52 resting on the upper surface of ribs 46 and yoke 45.

The location of the respective ports 77 and 78 is preferably in the upper portion of the wall of the cylinders 21, 22, and the location of ports 80 and 81 is preferably in the bottom portion of said walls, the location of the latter being to insure a carry-off of any water or sedimental matter in fluids such as gasoline.

An internal sleeve 98 may, if desired, be provided within the cylinder in one or more sections thereof to prevent wear on the cylinder walls, and to facilitate accurate port machining, and as shown in the drawings herein has been limited to the sections of the cylinders within which the valves 32, 33 reciprocate, and wherein the transfer ports 84, 87, 90 and 93 are located.

Means are provided to adjust the length of the stroke of the pistons in the cylinders for the purpose of conforming the piston stroke and registering mechanism to periodic tests for accuracy.

Figure 10:
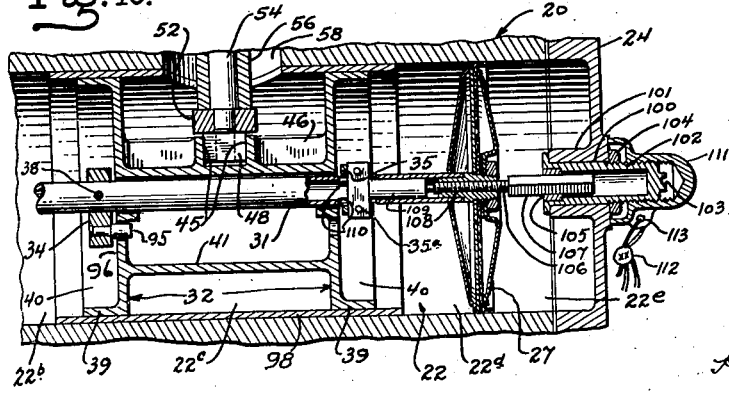
Fig. 10 is an enlarged detail of adjustment mechanism, also shown in Fig. 1.

In the preferred form herein shown (see Fig. 10) the cylinder head 24 of cylinder 22 has a central opening 100 axially aligned with connection rod 31, from the edges of which opening is a laterally inwardly extending cylindrical flange 101, providing a journal for a rotatable sleeve 102 which is keyed or slotted at its outer end, as at 103, and which may be locked against casual rotation by nut 104 threadedly mounted thereon. The opposite end of the sleeve 102 is provided with an opening 105 therein, preferably square, and within which is reciprocably slidable a pin 106 having at one end portion a shank 107 conforming in shape to the opening 105, so that the pin turns only when sleeve 102 is rotatably manipulated. The opposite end portion of the pin 106 has threaded engagement as at 108 within one end of the connecting rod 31 and by means such as a filler member 109, is adapted to longitudinally adjust the collar 35 which is keyed as at 35a in a slot 110 in the connecting rod, thus providing a stop member for delimiting relative movement of the connecting rod and valve. In this manner a predetermined degree of free motion may be provided in the pistons 26 and 27 without a corresponding movement of valve 32, which latter connects with the registering mechanism. This free motion may be relatively small in accurately machined mechanisms, and it is believed that one-eighth inch will normally be sufficient. A cap 111 is threadedly mounted on the sleeve 102 and may be removed for key rotation of the sleeve.

To insure against unauthorized tampering with the adjustment mechanism, a seal 112 may be provided impressed on a wire which is threaded through openings 113 in the cap 111 and one of the nut bolts 25 by which the cylinder head bearing the adjustment mechanism is mounted on the cylinder block.

For purposes of reducing weight of material, usual core imprints may be made in castings, such as indicated 99 in the cylinder heads of Figs. 2 and 3.

It will be obvious that the conduits 76a, 76b, 79a, 79b, 82, 85, 88 and 91 are within the cylinder block or housing and outside the cylinders. The partition wall 20a extends laterally transverse the cylinder block and circumferentially of the cylinder chambers, so that the fluid from one conduit does not flow into another conduit except through the respective cylinders.

I claim:—

1. A fluid meter comprising a pair of chambered cylinders, each having an inlet opening and an outlet opening and a plurality of exchange ports, said cylinders having conduits in communication with said exchange ports from one cylinder to the other cylinder, a pair of pistons and a valve mounted in each cylinder and connected in spaced relation with the valve intermediate the pair of pistons, said valve and pistons of each cylinder being adapted for reciprocation in unison responsive to flow of fluid through the meter, said valves each having an opening longitudinally axially therethrough whereby fluid may flow therethrough from the cylinder chamber at one end of the valve to the cylinder chamber at the other end of the valve, and said valves being adapted upon reciprocation thereof for intermittently interrupting the communication from one cylinder to the other through said exchange ports and conduits.

2. A fluid meter comprising a pair of chambered cylinders, each provided with an inlet opening and an outlet opening and a plurality of exchange ports; said cylinders having conduits in communication with said exchange ports from one cylinder to the other cylinder, a unit in each cylinder comprising a pair of spaced pistons having a connection member therebetween and a valve mounted in spaced intermediate relation to the pistons, the pistons and valve unit in each cylinder being adapted for unitary reciprocation responsive to flow of fluid through the meter, each of said valves having a conduit longitudinally thereof and a conduit transversely thereof, and said valves being adapted for intermittently interrupting communication from their respective cylinder to the other cylinder through said exchange ports and conduits upon reciprocation of the piston and valve units.

3. A fluid meter comprising a pair of chambered cylinders each having an inlet and an outlet port and a plurality of exchange ports, said cylinder being provided with conduits communicating with said exchange ports from one cylinder to the other cylinder, a unit mounted in each cylinder and adapted for reciprocation responsive to flow of fluid through the meter, each of said units comprising a pair of connected pistons and a valve in spaced relation therebetween, said valve of each unit having a conduit axially therethrough and being adapted, upon reciprocation, for intermittently opening and closing exchange ports of that cylinder, and means interposed operatively between the units whereby the reciprocation of the respective units may be maintained in relatively opposite directions, the said valve of each unit having a conduit transversely thereof in intermittent communication with the exchange ports of that cylinder upon reciprocation of the valve.

4. A fluid meter comprising a plurality of chambered cylinders each provided with an intake opening and an exhaust opening and a plurality of exchange ports, one of said exchange ports being adjacent the respective heads of the cylinders and two pairs of said exchange ports being intermediate said heads, conduit members which communicate from an intermediate exchange port of one cylinder to an exchange port adjacent the head of the other cylinder, a unit mounted in each cylinder and adapted for reciprocation responsive to flow of fluid through the meter, each of said units comprising a pair of connected pistons and a valve in spaced relation therebetween, said valve of each unit having a conduit axially therethrough and being adapted, upon reciprocation, for intermittently opening and closing intermediate exchange ports of that cylinder, the said valve of each unit having a conduit transversely thereof in intermittent communication with the intermediate exchange ports of that cylinder upon reciprocation of the valve.

5. A fluid meter comprising a housing provided with an inlet opening and an outlet opening and a pair of cylinder chambers each having an intake and an exhaust port and a plurality of exchange ports, said housing having conduits in communication respectively from one cylinder to the other through said exchange ports, a reciprocable unit mounted in each cylinder comprising a pair of connected pistons and a valve in spaced relation therebetween, the respective units being adapted for synchronous reciprocation in relative opposite directions responsive to flow of fluid from one cylinder to the other through the exchange ports and conduits, one of said reciprocable units having the valve member movable relative to the pistons whereby a degree of lost motion is caused between the pistons and valve, and means whereby relative movement of pistons and valve in said one cylinder may be adjusted, said last mentioned means extending through a normally closed opening in the wall of said one cylinder and being manipulable from the exterior of the cylinder while said opening remains closed.

6. A fluid meter comprising a pair of chambered cylinders, each of said cylinder chambers having an intake port and an exhaust port, and a plurality of exchange ports intercommunicating from cylinder to cylinder through conduits, a unit mounted in each cylinder chamber and reciprocable synchronously in opposite relative directions responsive to flow of fluid from one cylinder to the other cylinder, each unit comprising a connecting rod having mounted thereon pistons at opposite end portions and a valve in spaced relation therebetween, said valve in each unit having fluid conduits, respectively, longitudinally and transversely of the cylinder, and said valves being adapted, upon reciprocation of the unit, for alternately opening and closing a portion of said exchange ports.

7. A fluid meter comprising a housing provided with an inlet opening and an outlet opening and a pair of cylinder chambers, each of said cylinder chambers having a pair of ports communicating respectively with the inlet and outlet openings of the housing and a plurality of exchange ports intercommunicating from cylinder to cylinder, a unit mounted in each cylinder chamber and reciprocably responsive to flow of fluid in the meter, each unit comprising a connecting rod having mounted thereon pistons at opposite end portions and a valve in spaced relation therebetween, said valves having conduits respectively longitudinally and transversely of the cylinder, and adapted for alternately opening and closing a portion of said other ports, the valve in one of said units having a degree of movability relative to its piston connection, a register, means operative responsive to reciprocation of the units in the cylinders whereby the register may be actuated, and means whereby relative movement of pistons and valve of said one unit may be adjusted from the exterior of the cylinder.

8. A fluid meter comprising a housing provided with an inlet opening and an outlet opening, and a pair of cylinder chambers each having an intake port and an exhaust port and a plurality of exchange ports, said cylinders having conduits in communication from one cylinder to another cylinder through said exchange ports, a reciprocable unit in each cylinder comprising a pair of spaced pistons having a connecting member therebetween and a valve mounted on the connecting member in spaced relation to the pistons, said respective units being adapted for synchronous reciprocation in relative opposite directions responsive to flow of fluid from one cylinder to the other through the exchange ports and conduits, at least one of said reciprocable units having a degree of lost motion between the pistons and valve thereof, and means whereby the degree of lost motion between pistons and valve in said one reciprocable unit may be adjusted, said last mentioned adjustment means extending beyond the enclosure of the cylinder chamber and being thereby manipulable from the exterior thereof while the cylinder chamber remains closed.

9. In a fluid meter having a plurality of cylinders each provided with an inlet and an outlet port and other exchange ports intercommunicating from cylinder to cylinder, a unit mounted in each cylinder and reciprocable responsive to flow of fluid in the meter, said unit comprising a connecting rod having mounted thereon pistons at opposite end portions and a valve in spaced relation therebetween, said valve providing conduits respectively longitudinally and transversely of the cylinder and adapted for alternately opening and closing a portion of said exchange ports, a rotatable shaft mounted in each cylinder wall, a register adapted to be actuated responsive to the rotation of said shafts, means interposed between said shafts and the units in the cylinders whereby reciprocal motion of the units is translated to rotary motion of said shafts, and means for transmitting the rotary motion of both of said shafts to the register.

10. In a fluid meter having a plurality of cylinders each provided with an inlet and an outlet port and other ports intercommunicating from cylinder to cylinder, a unit mounted in each cylinder and reciprocable responsive to flow of fluid in the meter, each unit comprising a connecting rod having mounted thereon pistons at opposite end portions and a valve in spaced relation therebetween, said valve providing conduits longitudinally and transversely of the cylinder and adapted for alternately opening and closing a portion of said other ports, the valve in one of said units having a degree of movability relative to the connecting rod, a rotatable shaft mounted in each cylinder wall, a register operative responsive to the rotation of said shafts, and means interposed between an end portion of said shafts and the units in the cylinders whereby reciprocal motion of the units is translated to rotary motion of said shafts, and means whereby relative movement of pistons and valve of said one unit may be adjusted from the exterior of the cylinder.

11. In a meter of the character described, a registering device, a pair of cylinders having intake, exhaust and intercommunicating ports, a reciprocable unit in each cylinder including connected pistons and a valve in spaced relation therebetween, each unit adapted for reciprocation in the cylinder responsive to flow of fluid through the meter, and means adapted for translating reciprocal motion of the units to rotary motion in the registering device, said last mentioned means comprising a yoke transversely mounted on each reciprocable unit, members adapted to slide in the yokes, a crank connected to each slide member, a rotatably mounted shaft mounted on each crank, a gear mounted on each shaft and rotatable therewith, a pinion intermeshed with both said gears and a drive shaft mounted on said pinion, and connected with the registering device.

12. In a meter of the character described having a ported cylinder housing provided with an opening in one end wall, a unit in the housing reciprocable therein responsive to flow of fluid through the meter, comprising a connecting rod, pistons mounted at opposite end portions thereof, and a valve mounted on the rod in spaced relation to the pistons, said rod having a degree of longitudinal free movement relative to said valve, means adapted to delimit relative free movement of rod and valve, and means whereby the length of said relative free movement may be adjusted from the exterior of the cylinder housing, said latter means comprising a pin threadedly engaging one end of and axially aligned with the connecting rod and having one end bearing against the means which delimits the relative free movement of rod and valve, and an axially rotatable sleeve mounted in the opening in the end wall of the housing in axial alignment with the connecting rod and engaging said pin whereby said pin may be axially rotated.

13. In a fluid meter having a housing provided with an opening in one end wall, means manually operable from the exterior of the meter to delimit free relative movement between a reciprocable connecting rod and a valve member slidably mounted thereon within the housing, said means comprising a stop member movably mounted relative to the connecting rod, an axially rotatable sleeve mounted in the opening of the end wall in axial alignment with the connecting rod, a pin axially aligned with the connecting rod and having one end in threaded engagement therewith whereby the stop member may be moved, and the other end of the pin being slidably mounted in the sleeve, said sleeve including a bearing adapted to receive and support said pin end and to maintain said pin against casual axial rotation.

14. In a fluid meter having a housing provided with an opening in one end wall, means manually operable from the exterior of the meter to delimit free relative movement between a reciprocable connecting rod and a valve member slidably mounted thereon within the housing, said means comprising a stop member movably mounted relative to the connecting rod, an axially rotatable sleeve mounted in the opening of the end wall in axial alignment with the connecting rod, a pin axially aligned with the connecting rod and having one end in threaded engagement therewith whereby the stop member may be moved and the other end of the pin being slidably mounted in the sleeve, said sleeve including a bearing adapted to receive and support said pin end and to maintain said pin against casual axial rotation, and a lock nut mounted on the sleeve adapted to maintain said sleeve against axial rotation relative to the housing.

15. In a fluid meter provided with a valve to regulate fluid flow through the meter and having a cylinder within which is mounted a reciprocable piston which has a degree of free movement relative to the valve, said valve and piston having interposed therebetween means whereby the relative free movement between piston and valve may be delimited, said cylinder having an opening in an end wall, mechanism whereby the said delimiting means may be adjusted from the exterior of the cylinder, said mechanism including a pin threadedly engaging the piston and having one end bearing against the said delimiting means, an axially rotatable sleeve mounted in said opening in the end wall of the cylinder and within which the other end of the pin is adapted for reciprocation, and said sleeve being manipulable from the exterior of the cylinder whereby said pin may be axially rotated.

16. In a fluid meter provided with a valve to regulate fluid flow through the meter and having a cylinder within which is mounted a reciprocable piston which has a degree of free movement relative to the valve, said valve and piston having interposed therebetween means whereby the relative free movement between piston and valve may be delimited, said cylinder having an opening in an end wall, means to normally close said opening, mechanism whereby the said delimiting means may be adjusted from the exterior of the cylinder, said mechanism comprising an axially rotatable pin adapted for threadedly engaging the piston and having one end bearing against the said delimiting means, said pin being accessible to manipulation through said opening in the end wall of the cylinder.

17. A fluid meter comprising a housing provided with an inlet opening and an outlet opening and a pair of cylinder chambers each having an intake and an exhaust port and a plurality of exchange ports, said housing having conduits intercommunicating between the cylinders through said exchange ports, a reciprocable unit mounted in each cylinder comprising a pair of connected pistons and a valve in spaced relation therebetween, said valve having a conduit transversely of the cylinder enclosing it, and each valve having a conduit axially longitudinally of its body, the respective units being adapted for synchronous reciprocation in relative opposite directions responsive to flow of fluid from one cylinder to the other through the exchange ports and conduits, a rotatable shaft for each of said units mounted in the respective cylinder walls, each of said shafts having crank connection at one end with one of said reciprocable units and having connection at the opposite end with a registering device.

HOSMER L. BLUM.